United States Patent [19]

Woog

[11] Patent Number: 4,988,448
[45] Date of Patent: Jan. 29, 1991

[54] METHOD FOR REMOVING SUBSTANCES FROM A SOLUTION

[76] Inventor: Manfred J. Woog, 1040 Pershing St., Craig, Colo. 81625

[21] Appl. No.: 451,323

[22] Filed: Dec. 15, 1989

[51] Int. Cl.[5] .................. B01D 15/00; B01D 37/03
[52] U.S. Cl. ............................... 210/665; 210/669; 210/694; 430/399
[58] Field of Search .................. 210/665–667, 210/669, 694, 265; 430/399

[56] References Cited

U.S. PATENT DOCUMENTS

| | | | |
|---|---|---|---|
| 3,558,482 | 1/1971 | De Young | 210/265 |
| 3,736,253 | 5/1973 | De Angelis et al. | 210/669 |
| 4,325,732 | 4/1982 | Woog | 75/109 |
| 4,608,177 | 8/1986 | Woog | 210/738 |
| 4,662,613 | 5/1987 | Woog | 266/170 |

Primary Examiner—Ivars Cintins

[57] ABSTRACT

A filtering assembly is provided for removal of certain substances from a solution. More particularly, apparatus and a related method are provided for removal of hazardous or environmentally unacceptable chemicals from a waste solution before it is discharged. The device includes a cylindrical housing having a spaced apart inlet and outlet. Adjacent the inlet, a metal precipitate chamber is provided to collect precipitates which includes rolled fiberglass for capturing precipitates. A filter subassembly is provided on the downstream side of the inlet. The solution is then directed through an adsorption chamber containing activated carbon. In this chamber, certain chemicals are adsorbed onto the carbon. A further filtering device may be provided intermediate the adsorption chamber and the outlet to collect any remaining particles. The solution is then substantially free of undesired and potentially hazardous substances and may then be discharged into the environment. The device and related method has particular application to the disposal of spent photochemicals such as developer solutions.

10 Claims, 2 Drawing Sheets

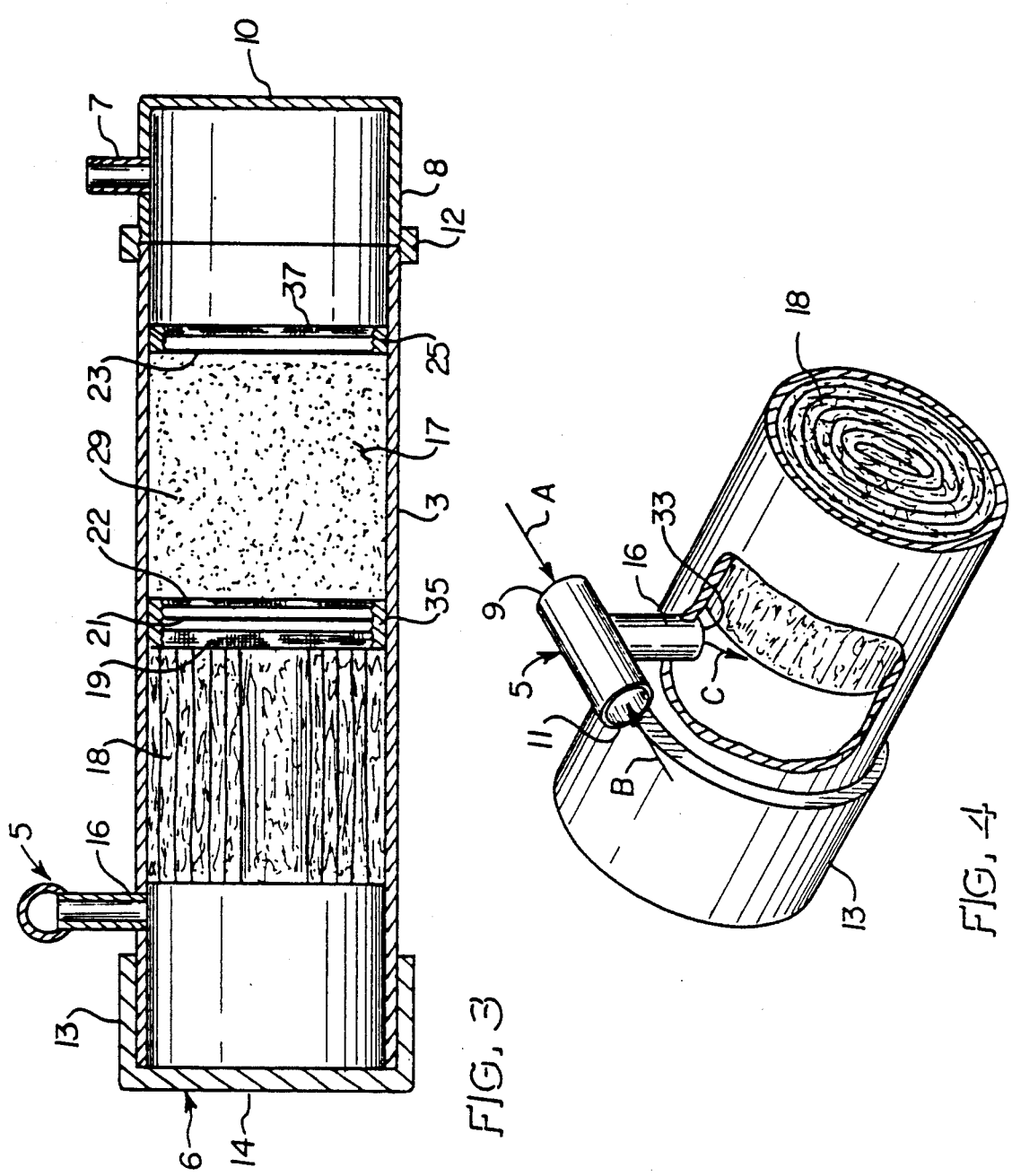

METHOD FOR REMOVING SUBSTANCES FROM A SOLUTION

BACKGROUND OF THE INVENTION

1. Field of the Invention

This invention relates to a system which may be used to remove from a solution certain substances and, in particular, it relates to removal of chemicals and compounds which are hazardous to the environment or to reclaim substances which are useful for some other purpose.

2. Description of the Prior Art

Environmental protection is of the utmost importance in today's society. Legislators have recognized the threats to the environment and have enacted protective legislation. Compliance with those increasingly stringent environmental protection regulations, however, is one of the greatest challenges facing industry today. Such compliance can become extremely costly to the point where competitive pricing can be jeopardized.

Many methods have been suggested to purify or at least make environmentally acceptable, industrial waste products. In the chemical industry, a particular problem relates to discharge of effluent into water supplies. The effluent must not contain certain substances beyond specific limits even though the water will later be treated in a treatment facility.

For example, certain legislation is directed toward retaining and preserving the biological oxygen demands in water supplies as well as the chemical oxygen demands in water supplies. It is required to minimize certain chemicals, such as ammonia, which are harmful to those qualities.

A variety of devices and methods have been known for purifying waste solutions. For example, it has been known to utilize reverse osmosis, ozinization, and resin ionic exchange.

In addition, it has been known to filter iron precipitates from photochemical solutions prior to discharge. A system for such a procedure is disclosed in U.S. Pat. No. 4,608,177, but it does not provide for removal of ammonia and similar substances.

Unfortunately, such prior art devices can be extremely complex and expensive. There remains a need for a simple, low cost device which can be readily employed to filter undesirable chemicals out of solutions on a smaller scale than the situations that previously known techniques have addressed.

It may also be desirable in other applications to filter out and reclaim useful substances which would otherwise be discarded and wasted. My U.S. Pat. No. 4,662,613 describes a reusable precious metal recovery cartridge which may be used, for example, to recover silver from certain photographic solutions. My U.S. Pat. No. 4,325,732 also discloses a precious metal recovery cartridge.

My prior patents, however, do not focus on removal of hazardous or environmentally unacceptable chemicals from the solution. There remains a need for an effective system which can remove unwanted substances from a solution and which can also be used to recover metals, and which devices may be used in connection with precious metal recovery cartridges, preferably, after the cartridges have been employed to recover the precious metals. As stated hereinbefore, there also remains a need for a simple, low cost device which is disposable and easy to use.

SUMMARY OF THE INVENTION

These and other needs have been satisfied by the device and method of the present invention which provides a system for the removal of certain chemicals from a waste solution. The system is particularly useful in treatment of spent photochemicals. Specifically, the invention involves the introduction of photochemical developer to fixer or to bleach and fixer combinations in order to precipitate out iron particles, as well as other chemical constituents. Thereafter, the solution is passed through a filtering system to remove any particles. Following the filtering stage, the solution passes through a chamber containing activated charcoal, and elements such as ammonia and other undesirable chemicals are removed. The solution then passes through a further filtering member, and any remaining solids are filtered out. At that point, the solution is free of the undesired substances and can be disposed of.

The device of the present invention includes a housing with an inlet in communication with a first chamber into which the waste solution is introduced. The solution may be mixed with at least one other solution which may be either acidic or basic in order for pH adjustment to cause precipitation of iron and other materials. Precipitates are then collected in a chamber containing a suitable filtering material such as rolled fiberglass. The precipitates may be recovered from the rolled fiberglass if they may be useful for some other purpose. Thereafter, the remaining solution is passed through a further filtering assembly and other residual solid particles are filtered out. The solution is then passed through an activated carbon adsorption chamber and, as mentioned hereinbefore, chemicals are adsorbed from the solution into the activated carbon. If desired, a further filtering assembly may be provided. The solution is then discharged from the housing. Permanent or removable top caps are provided on the housing.

It is an object of the present invention to provide a system which efficiently removes various chemicals from a solution before the solution is discarded.

It is another object of the invention to provide a system which is capable of removing hazardous or environmentally unacceptable chemicals from a solution.

It is another object of the invention to provide a system which allows recovery of certain metals which are precipitated out from the solution.

It is a further object of the invention to provide a device which is economical and easy to use.

It is a further object of the invention to provide a method of filtering solutions to remove certain substances.

It is a further object of the present invention to provide a system which allows removal of both useful substances and harmful substances from spent photochemical solutions.

These and other objects of the invention will be more fully understood from the following description of the invention, with reference to the illustrations appended hereto.

BRIEF DESCRIPTION OF THE DRAWINGS

FIG. 3 is a cross-sectional view taken through plane 3—3 of FIG. 1.

FIG. 4 is a partial, cross-sectional view of the device of FIG. 1 with a portion broken away to show the inlet of the present invention.

DESCRIPTION OF THE PREFERRED EMBODIMENTS

Figures 1, 2:
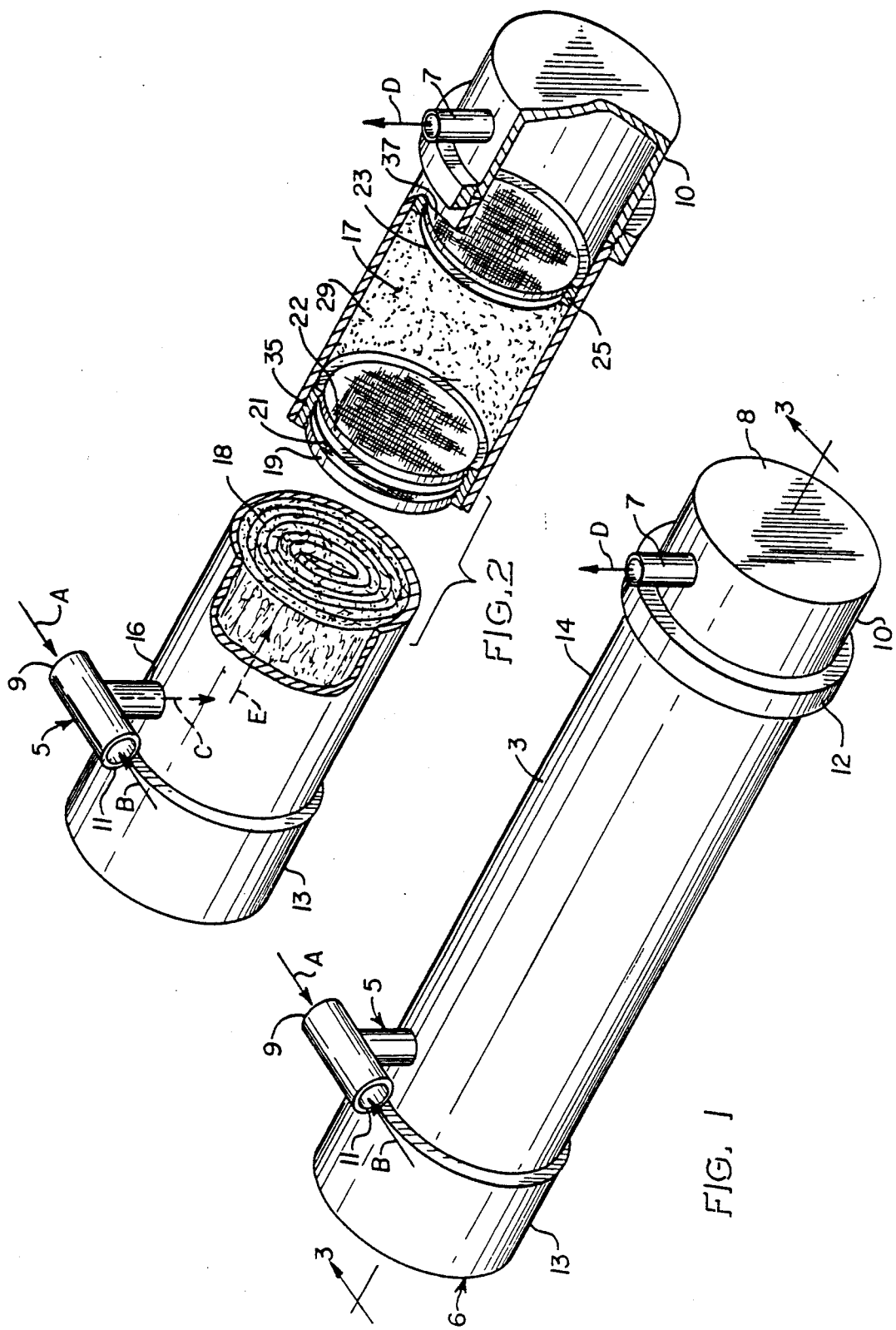
FIG. 1 is a perspective view of the system of the present invention.
FIG. 2 is an isometric view partially in section of the system of the present invention with a center portion broken away in order to show the adsorption chamber.

Referring more specifically to FIGS. 1 through 4, a preferred system of the present invention is shown. For simplicity of disclosure, hereinafter a system for the removal of hazardous or ecologically unacceptable materials from photochemical solutions will be explained, however, it is to be understood that the present invention is not limited to the removal only of hazardous substances from photochemical solutions; the device can be used with various solutions.

FIG. 1 shows the removal system having a generally cylindrical, hollow housing 3 which may be composed of stainless steel, polyvinyl chloride, acrylonitrile butadiene styrene, polypropyline, fiberglass, acrylic or other polyplastics, for example, and is preferably made of polyvinyl chloride or fiberglass. The cylindrical housing 3 has a dual inlet 5 and tubular outlet 7. The dual inlet 5 allows for a first solution to be introduced into the first tubular opening 9 and a second solution into the second tubular opening 11 of inlet 5.

Housing 3 is closed at the respective ends. The inlet end 6 of housing 3 may have a removable cap 13 thereon which can be unscrewed in order to gain access to precipitates that have collected therein. Outlet end 8 of housing 3 may also either be closed, except for tubular outlet 7 which is open, or it may be provided with a continuous removable cap which can be unscrewed and removed providing greater access to the interior of housing 3, if desired.

The cap 10 in the form shown is held in engaging relationship with housing 3 by annular sealing gasket member 12. The inside surface (not shown) of gasket 12 may be tapered so that the leading edge of the gasket 12 can receive end portion 14 of housing 3 and seal the engaging interface between the cap 10 and housing 3 to resist leakage of the liquid being treated. For convenience of disclosure, there is shown an annular ring gasket sealing member 12 against the housing exterior, but it is to be understood that any other suitable cap sealing means may be employed.

Referring now to FIGS. 2 and 3, the interior of the cylindrical housing 3 of the system of the present invention is shown. Inlet 5 has dual openings, i.e., first tubular opening 9 and second tubular opening 11 (FIG. 2). A waste solution, such as a spent developer which was used in photographic processing, would be introduced into tubular opening 9 in the direction A. A second solution is introduced into opening 11 in the direction B which will appropriately adjust the pH of the mixture of both solutions so as to cause the precipitation of metals from the developer introduced through opening 9. The second solution may preferably be either sodium bisulfate or sodium hydroxide or, in certain cases, an acidic substance depending upon the application as would be understood by one skilled in the art in order to effect the required pH adjustment to cause precipitation. If the desired precipitate is iron, for example, sodium bisulfate would be used as the second solution which is introduced into tubular opening 11. The solutions are introduced by hose connections (not shown) and are introduced at sufficient force to cause intimate admixing of the solutions, and this force would be readily understood by one skilled in the art.

Inlet 5 also has an opening 16 through which the first solution and second solution, having been mixed, flow in the direction C. Precipitation begins to occur in tubular inlet 5 around the area near opening 16 and as the solution flows out through opening C. In order to resist precipitates from flowing backwards in the direction opposite C, a filter material such as rolled fiberglass 18 may be provided as shown in FIGS. 2 and 3. Precipitates will be captured by rolled fiberglass 18. The fiberglass 18 can then be removed and the precipitates recovered from the fiberglass if desired.

Adjacent the rolled fiberglass 18 is placed a first fiberglass filter 19 (FIGS. 2 and 4). Fiberglass filter 19 serves to capture smaller particles such as iron precipitates and other precipitated compounds which may not have been trapped by surrounding fiberglass 18.

First polyester batten filter 21 is placed adjacent the first fiberglass filter 19 to further filter out any remaining particles which were too fine to be stopped by fiberglass filter 19.

Grate 22 has cylindrical support and a screen-like body portion. It has the function of structural support to hold the various items in position and to resist undesired deterioration of the adjacent filters. Grate 22 and filters 19 and 21 are held in place by hollow plastic spacer ring 35.

It should be understood that a different arrangement and numbers of grates and filters could be used while remaining within the context of the present invention. And further, it should be understood that the materials used for the various filters may be changed and different materials may be substituted therefor while remaining within the context of the present invention.

The system also contains within housing 3 activated carbon chamber 17. Activated carbon chamber 17 is shown in FIGS. 2 and 3. The chamber 17 contains carbon which has previously undergone the process of being acid washed and pelletized in order to remove iron from the naturally occurring carbon. The activated carbon may be in the form of loose pieces contained within chamber 17, or the pieces may be contained within a porous bag. Alternatively, the carbon may be affixed to another medium such as is shown in my prior U.S. Pat. No. 4,662,613 and No. 4,325,732 wherein I show a spiral configuration of a carbon exchange mass in connection with a precious metal recovery cartridge.

The pieces of the carbon in chamber 17 could be between about 0.06 in. and 0.02 in. in diameter and would preferably be 0.03 in. in diameter. Certain chemical constituents in the solution will adsorb onto the activated carbon of chamber 17 when the solution passes through chamber 17. Such chemicals may be, for example, ammonia, hydroquinone and other organic compounds. These are the chemicals which are either hazardous to health or to the environment and which should be removed or minimized prior to discharge of the solution into the environment.

A second polyester batten filter 23 may be placed adjacent the activated carbon chamber 17 toward the outlet end 8 of the cylindrical housing 3. This serves to retain any loose carbon pieces within the system. The housing 3 may also contain an additional grate 37 for support. A round plastic support element 25 may also be placed within housing 3 as shown in FIG. 3 to retain the various elements in a stationary position.

As noted hereinbefore, a permanent cap or ring-gasketed removable cap 10 (FIG. 1) may be placed at outlet end 8. Alternatively, a screw-on cap may be provided.

After the solution has passed through the activated carbon chamber 17, the undesired chemicals having been removed, it is discharged through outlet 7.

Referring now to FIG. 4, a more detailed view of inlet 5 and the interior of housing 3 are shown. Inlet 5 has tube 16 which has opening 33 leading into the housing 3.

As discussed hereinbefore, a spent developer solution is introduced into inlet opening 9 and flows in the direction A. A second solution such as fixer, as well as an additive providing suitable additional pH adjustment, if necessary in the application, are introduced by way of inlet opening 11 in the direction B. These solutions are mixed by their joint passage through opening 33 in inlet 5. As discussed hereinafter, the mixed chemicals then are allowed to react with each other through the appropriate dwell time according to demand and physical size of the housing 3.

In operation, tubular opening 9 would be connected to a hose connector leading from a source of spent developer to be disposed of, and the developer is thereby introduced into tubular opening 9 of inlet 5. Spent developer is usually highly alkaline, with a pH concentration of approximately 11 to 13. Tubular opening 11 has connected to it a hose connector leading from a source of photographic fixer which preferably already has undergone a desilvering process such as is described in my prior U.S. Pat. Nos. 4,662,613 and 4,325,732 discussed hereinbefore. The desilvered fixer is generally acidic with a pH of between about 4 to 5.

When the developer and fixer enter inlet 5 by way of tubular openings 9 and 11, respectively, they flow through tube 16 and opening 33 where they are mixed as they flow through causing some of the iron in the fixer to precipitate. The partially mixed liquids flow out of opening 33 into the housing 3. The developer and mixer further are allowed to react for a dwell time of between about 5 minutes and 15 minutes, and preferably for about 10 minutes. The solutions are thereby neutralized and iron plus other compounds are precipitated out of the mixture. As noted hereinbefore, the precipitates are trapped by rolled fiberglass 18. Fiberglass 18 may thereafter be removed and the precipitates recovered therefrom by any suitable means.

In many applications, it may be necessary to provide additional pH adjustment to cause the solutions to be neutralized. In such a case, a suitable alkaline or acidic additive, as would be known to those skilled in the art, may be added to the fixer and, after being mixed with the fixer, the resulting solution can then be introduced into the system through tubular opening 11.

The flow rate of the mixture in the direction C must be sufficiently slow to allow the developer and fixer to react. In addition, the flow through activated carbon chamber 17 must be long enough to allow adequate adsorption. As would be readily understood by those skilled in the art, a longer period of contact between the solution and the activated carbon, would lead to a greater amount of chemicals being loaded onto the carbon. An appropriate flow rate would be between 100 and 300 cc per minute per cubic foot of carbon, and would preferably be 200 cc per minute per cubic foot of carbon. This would, however, depend upon the size of the housing to be used in the application.

The solution may be pumped in the direction E (FIG. 2). Alternatively, the solution may be drawn back in the direction E by gravitational forces depending upon the orientation of the device in the particular application. It would be obvious to those skilled in the art how to achieve the desired flow rate.

Precipitated particles which may have escaped fiberglass 18 may be filtered out by grate 22, depending upon the mesh size chosen for the grate 22. In addition, fiberglass filter 19 and polyester filter 21 filter out even finer residual particles. The solution is thereafter passed through activated carbon chamber 17. Here chemicals, such as ammonia are adsorbed onto the activated carbon. In this way, harmful chemicals are removed and the solution is made environmentally acceptable and it is ready to be discharged to a sewer system. In addition, iron and, in other applications, other metals can be recovered from the housing 3.

It should be understood that the device and method have application beyond the photochemical application which was discussed herein as an exemplary embodiment.

It will be appreciated that the invention provides a method and apparatus for the removal of certain undesired materials in an efficient and economical manner.

Whereas particular embodiments of the invention have been described hereinbefore for purposes of illustration, it will be appreciated by those skilled in the art that numerous variations of the details may be made without departing from the invention as described in the appended claims.

What is claimed is:

1. A method of treating a waste solution to remove predetermined chemicals and metals before said waste solution is discharged into the environment, including the steps of:

providing a generally cylindrical housing having a first interior chamber and a second interior chamber in communication therewith, and inlet means in communication with said first interior chamber and outlet means in communication with said second interior chamber, introducing said waste solution into the first interior chamber housing through the inlet means, introducing at least one precipitation-causing solution of a predetermined pH into said first interior chamber through said inlet means, mixing the waste solution with said precipitation-causing solution to facilitate precipitation of metals from the waste solution, collecting precipitated metals, subsequently introducing the waste solution into said second interior chamber, filtering particles out of said solution, establishing contact between said solution and activated carbon disposed within said second interior chamber, adsorbing said chemicals out of said solution onto said activated carbon, and discharging the filtered solution out of the housing through said outlet means.

2. The method of claim 1 including
   after adsorbing said chemicals onto said activated carbon, filtering additional particles out of said solution prior to discharging said solution.

3. The method of claim 1 including initiating said mixing of said waste solution with said precipitation-causing solution within said inlet means.

4. The method of claim 1 including
exposing said solution to said activated carbon during said adsorbing for a period of about 5 to 15 minutes whereby said solution will have adequate dwell time to facilitate efficient adsorption.

5. The method of claim 4 including
introducing mixed solution into said second interior chamber at a flow rate of about 100 to 300 cc per minute per cubic foot of activated carbon.

6. The method of claim 1 including
collecting at least a portion of precipitated metals onto a rolled fiberglass member disposed within said first interior chamber.

7. The method of claim 1 including
introducing photochemical developer as said waste solution.

8. The method of claim 1 including
introducing photographic fixer as said precipitation-causing solution.

9. The method of claim 8 including
pre-mixing sodium bisulfate with said fixer prior to introduction of said fixer to said inlet means, and
employing said sodium bisulfate as mixed with said fixer as said precipitation-causing solution.

10. The method of claim 8 including
pre-mixing sodium hydroxide with said fixer prior to introduction of said fixer to said inlet means, and
employing said sodium hydroxide as mixed with said fixer as said precipitation-causing solution.

* * * * *